Sept. 4, 1951    S. GOLDMAN    2,566,882

COMMUNICATION SYSTEM

Filed March 11, 1943    2 Sheets-Sheet 1

Inventor:
Stanford Goldman,
by Harry E. Dunham
His Attorney.

Inventor:
Stanford Goldman,
by Harry E. Dunham
His Attorney.

Patented Sept. 4, 1951 2,566,882

UNITED STATES PATENT OFFICE 2,566,882

COMMUNICATION SYSTEM

Stanford Goldman, Fairfield, Conn., assignor to General Electric Company, a corporation of New York Application March 11, 1943, Serial No. 478,760

4 Claims. (Cl. 250—9)

This invention relates to radio communication systems and it is an object of my invention to provide a new and improved radio transmission system in which communication is had with a high degree of secrecy and freedom from jamming.

Figure 1:
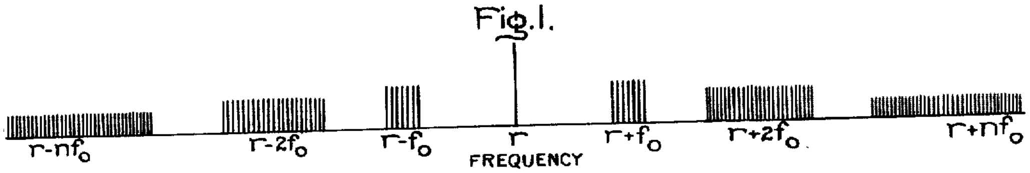
Figure 2:
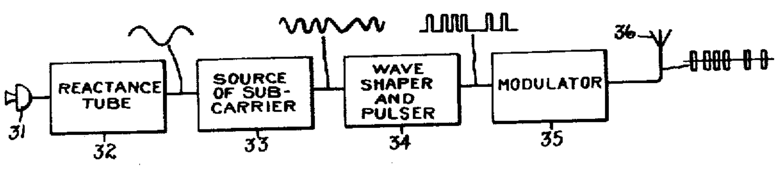
Figure 3:
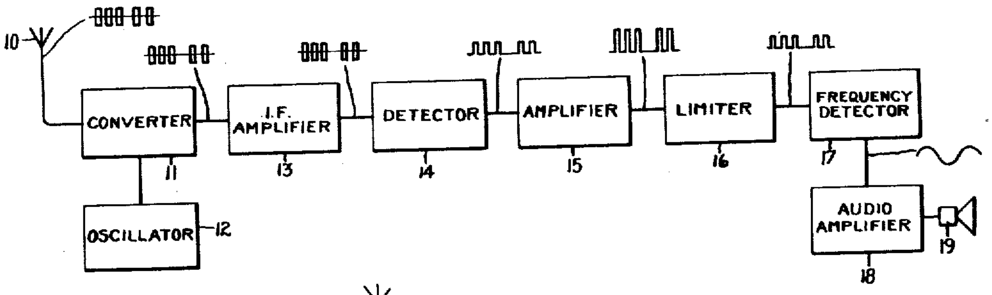
Figure 4:
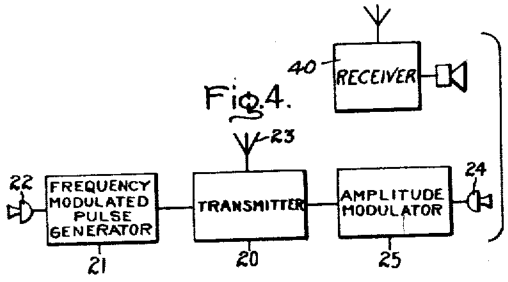
Figure 5:
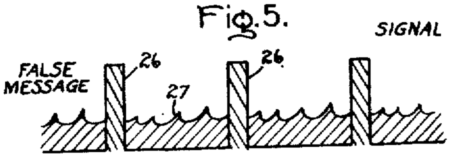
Figure 10:
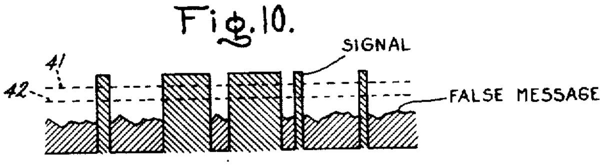
Figure 11:
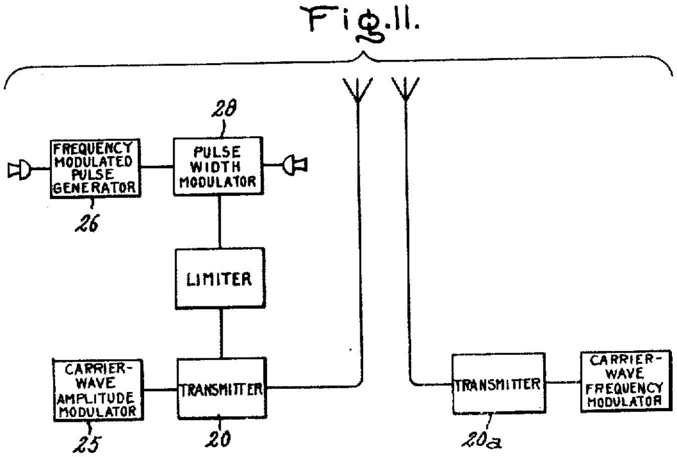

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 illustrates diagrammatically the frequency spectrum of a pulse frequency modulated radio signal; Fig. 2 illustrates in block form a suitable transmitter for pulse frequency modulated signals; Fig. 3 illustrates in block form a suitable receiver for pulse frequency modulated signals; Fig. 4 illustrates in block form a form of transmitter and receiver embodying the principles of my invention; Fig. 5 illustrates diagrammatically a possible condition of operation of the transmitter shown in Fig. 4; and Figs 6, 7, 9 and 11 illustrate in block form different embodiments of my invention; Fig. 8 illustrates in block form a receiver operable in conjunction with various transmitters embodying my invention; and Fig. 10 illustrates diagrammatically a possible condition of operation of the transmitter shown at Fig. 9.

My invention relates to the transmission of pulses of high radio-frequency carrier waves or oscillations. This system of communication is advantageous, especially in the high radio-frequency ranges, because for a given average power it is possible to operate the transmitting oscillator at high instantaneous powers and, consequently, high efficiency. The pulse rate is normally some superaudible rate as, for example, 50 kilocycles. Signal intelligence is imposed on the high frequency oscillations or carrier wave by amplitude, width, or frequency modulating the pulses with the desired audio signal. In accordance with my invention there is imposed on the desired pulse signal a masking or false signal of a different character of modulation of sufficient energy content to mask or cover up the effect of the desired signal except in a receiver adapted to receive that particular type of modulated pulse signals. While my invention is useful with all types of pulse modulation, application to pulse frequency modulation is herein described.

In Fig. 1 there is represented the frequency spectrum of a possible pulse frequency modulation transmission, the extent of the frequency spectrum being considerably wider than that covered by ordinary frequency modulation. If the center frequency, or average frequency, of operation is represented by $r$, zones of detection occur at $r-f_0$, $r+f_0$, $r-2f_0$, $r+2f_0$, etc. where $f_0$ is the pulse repetition frequency.

In Fig. 2 there is illustrated in block form a suitable transmitter for pulse frequency modulated signals, the wave shapes being shown at various points. The signal is impressed on a microphone 31. The output, which may be amplified if desired, may be utilized to frequency modulate by means of a reactance tube device 32 a superaudible channel oscillator or source of sub-carrier 33 which oscillates at the pulse rate. In a pulser and wave shaper 34, the incoming frequency modulated sinusoidal wave is transformed into frequency modulated pulses which are used to modulate the transmitter as indicated by the numeral 35. The modulated signals are radiated from a suitable antenna 36.

In Fig. 3 there is illustrated in block form a receiver capable of transforming the signals shown in Fig. 1 into an audio signal which can be reproduced by a suitable means as, for example, a loudspeaker. The incoming signal enters from the antenna 10 into a suitable converter 11. The signal, after mixing with oscillations from a local oscillator 12, is passed through the intermediate amplifier 13, and then impressed on a detector 14 which may be an amplitude modulation type of envelope detector. The output from the detector consists of the pulse signal alone, a possible wave shape being shown. The signal may then be amplified in an amplifier 15 and then passed through a suitable limiter 16 which may comprise both top and bottom limiting of the pulses for purposes of noise elimination. The signal then goes through a suitable frequency detector 17 which may be of the pulse counter or discriminator type. The output of the frequency detector is the audio signal itself which can be amplified as by means of an audio amplifier 18 and heard in a conventional manner as through a loudspeaker 19.

If it be assumed that persons not authorized to receive the signal transmitted by the system described use amplitude modulation detectors, the average detector current in such detectors, in general, varies with the audio signal and consequently some signal detection takes place.

In Fig. 4 there is shown an embodiment of my invention which renders it impossible to use an amplitude modulation detector for receiving the pulse frequency modulated signals. I have illustrated a suitable transmitter 20 which may comprise a high frequency source of oscillations or carrier wave and which may also include power amplifiers and any other desired apparatus. The carrier wave produced in the transmitter 20 is modulated by a suitable frequency modulated pulse generator 21, modulation being in accordance with the signals impressed upon the microphone 22. Thus there will be transmitted from the antenna 23 the pulse frequency modulated signal. In this form of my invention there is also provided means for transmitting on the same carrier wave another signal of ordinary amplitude modulation, as for example, a second microphone 24 and an amplitude modulator 25 arranged to modulate further the carrier wave.

In Fig. 5 there is shown the resulting signal, the numeral 26 indicating the pulses transmitted in accordance with the desired signal and the numeral 27 indicating the masking amplitude modulated signal, the latter signal filling the spaces between the pulses 26. It will be understood that, were it not for amplitude limiting as by tube saturation, the masking modulation of the continuous carrier wave would appear superposed upon the pulses of Fig. 5. As a practical matter, however, the pulse amplitude is limited by saturation, so that the masking signal appears only between the pulses 26. The amplitude modulation signal preferably should have substantially greater energy content, as several times the energy content, of the pulse frequency modulation signal but only substantially less, as about one-third, the peak amplitude as indicated in Fig. 5. Under these circumstances, the false signal will mask the effect of the pulse frequency modulated signal in the amplitude modulation detector and unauthorized persons will not only fail to decipher the true signal but will be totally unaware of its presence. At the same time, a pulse frequency modulation receiver tuned to the transmitted band of frequencies will be practically unaffected by the false signal provided bottom limiting is used to eliminate all signals below a desired level.

In order to render the masking signal most effective, it is desirable to use a low pulse repetition rate as, for example, of the order of 15 kilocycles. The time constants of the usual amplitude modulation detector circuit are such that at a higher pulse rate it would tend to follow the pulse peaks rather than take into account the integrated effect of the pulse and masking signals.

A second way of providing masking is to modulate the pulse width with a false signal. A transmitter for accomplishing this result is illustrated in block form in Fig. 6. The false signal from the microphone 24 is used to modulate the frequency modulated pulses in a pulse width modulator 28. If desired, such false signal modulation of pulse width may be introduced without disturbing the frequency of the leading edges of the pulses by means of a doubly modulated multivibrator of the type described at page 88 of "Radio Facsimile," volume 1, October 1938, published by the R. C. A. Institutes Technical Press. The pulse width modulated signal may then be fed through a suitable limiting device 29 and then utilized to modulate the carrier wave before it is radiated from the antenna 23. The pulse frequency modulation may be detected in a receiver 40 without interference from the pulse width modulation by utilizing in the receiver a frequency detector of the pulse counting type, such as that shown at page 270 of the "RCA Review" for January 1942. The receiver 40 is shown in greater detail at Fig. 8. With this arrangement, the repetition rate of the pulse frequency modulated signal does not have to be low because the masking signal now has the same peak amplitude as the pulse frequency modulation signal, the limiting means 29 insuring that the pulses have the same amplitude. It will be evident that the false signal modulation of pulse width will effectively mask the pulse frequency modulation signal against the detection by an ordinary amplitude modulation detector by reason of the fact that the average direct current value of the signal pulses is no longer proportional to their frequency.

When an unauthorized person is using a frequency modulation detector, the pulse frequency modulated signal, in the absence of false signals, can be detected by centering the discriminator at the center of any one of the groups of side bands in Fig. 1. In this case the signal may be masked by placing false frequency modulation side bands of the ordinary carrier wave type throughout the entire frequency band including the gaps between the side bands. A suitable transmitter is indicated in Fig. 7 which is substantially the same as Fig. 4 except that a frequency modulator 30 is employed in place of the amplitude modulator 25 of Fig. 4. With this arrangement, an ordinary discriminator would demodulate all frequency modulation present and masking would result. With the arrangement of Fig. 7 it is advisable to provide a wide frequency deviation with the false signal so as to cover the entire frequency range of the pulse frequency modulation components. With this arrangement, also, a low pulse repetition rate is advantageous because the pulse frequency modulation energy side bands are spread more uniformly over the frequency band which makes it less likely that the enemy will be able to obtain the true signal by tuning.

As mentioned above, modulation of pulse width by the false signal will also cause masking with the ordinary frequency modulation detector.

It should be particularly difficult for unauthorized persons to become aware of the existence of the secret signal if ordinary amplitude modulation or frequency modulation signalling is usually carried out on the band of frequencies utilized for the desired signals. The false signal may consist either of entertainment programs or specifically false information or irrelevant and distracting signals.

Figure 6:
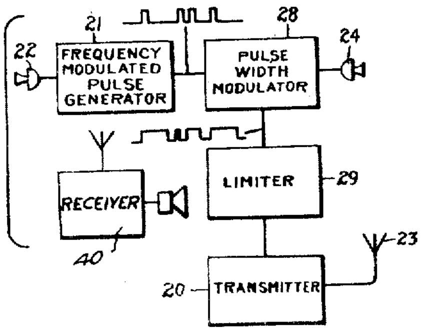
Figure 7:
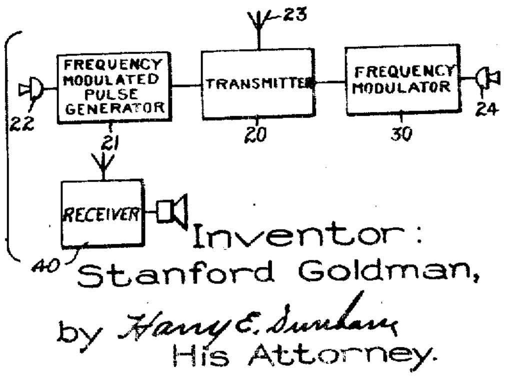
Figure 8:
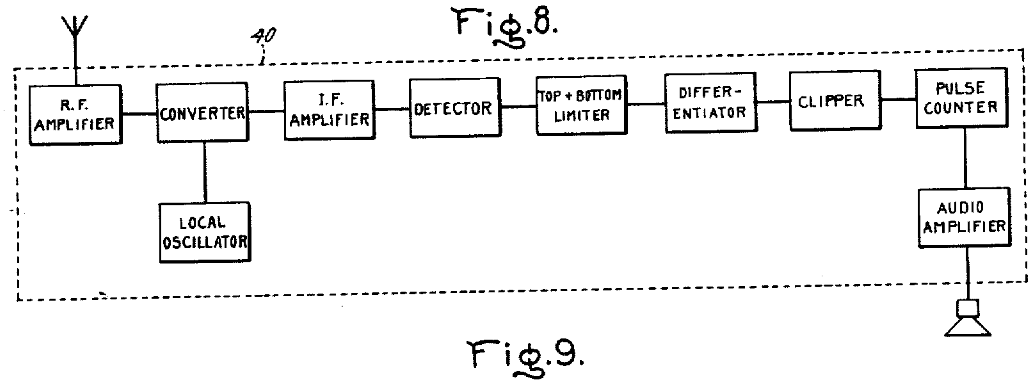
Figure 9:
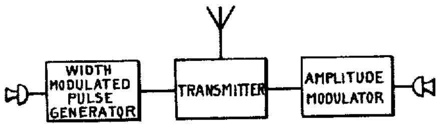

The receiver 40, shown at Fig. 8, is capable of detecting the desired signal and rejecting the masking signal from any of the transmitters shown at Figs. 4, 6, and 7.

As previously mentioned, my invention is useful not only in connection with pulsed electromagnetic energy signal modulated in frequency, but also with other types of pulse signal modulation. For example, at Fig. 9, I have shown a transmitter similar to that of Fig. 4, but in which the desired signal is impressed as pulse width modulation rather than pulse frequency modulation. The masking, as at Fig. 4, is accomplished by amplitude modulation of the carrier wave between the pulses. The resulting signal is shown at Fig. 10. It will be understood, as previously indicated in connection with the receiver of Fig. 8, that for detection, the signal of Fig. 10 is subjected to top and bottom limiting, as indicated by the dotted lines 41 and 42 at Fig. 10.

While I have described my invention in connection with transmitters which modulate a carrier wave with signals of two different types or character, it is also within the scope of my invention to add false signals of any number of different types of modulation. Moreover, while I have described several types of modulation applied to a single carrier wave, my invention also contemplates transmitting the desired and one or more false signals over entirely separate transmitters and antennas operating on substantially the same band of frequencies. For example, I have shown at Fig. 11 a pulse transmitter 20 wherein the pulse frequency is modulated in accordance with a desired signal, as in a modulator 26, and the pulse width is modulated in accordance with a masking signal, as in a modulator 28, while additional masking is provided by amplitude modulation of the carrier wave between pulses, as in a modulator 25. The doubly masked signal from the transmitter 20 may be used alone, but, if desired, an additional transmitter **20*a* may be used simultaneously to emit a carrier wave of the same frequency but modulated in frequency in accordance with a third masking signal. Similarly, if the transmitter 20*a* is used, the modulator 25 or 28, or both, may be omitted in connection with the transmitter 20**.

While I have shown and described a particular embodiment of my invention, it will be obvious to those skilled in the art that changes and modifications may be made without departing from my invention in its broader aspects, and I therefore aim in the appended claims to cover all such changes and modifications as fall within the true spirit and scope of my invention.

What I claim as new and desire to secure by Letters Patent of the United States is:

1. In combination, a source of high frequency oscillations, means for producing a succession of pulses, means for modulating said pulses in accordance with a first signal, means for frequency modulating said oscillations with said modulated pulses, means for further frequency modulating said oscillations in the intervals between said pulses in accordance with a second signal whereby the effect of the first-mentioned modulating means is substantially masked except in receiving means adapted to select only the first signal modulation, and continuously operative receiving means responsive only to said first signal modulation.

2. In combination, a source of carrier wave of high frequency oscillations, means for producing a succession of pulses, means for frequency modulating said pulses in accordance with a first signal, means for transmitting said frequency modulated pulses on said carrier wave, and means for frequency modulating said carrier wave between said pulses in accordance with a second signal.

3. In combination, a source of carrier wave of high frequency oscillations, means for producing a succession of pulses, means for frequency modulating said pulses in accordance with a first signal, means for transmitting said frequency modulated pulses on said carrier wave, means for continuously frequency modulating said carrier wave between said pulses in accordance with another signal, said other signal having at least as great a frequency range as said frequency modulated pulses.

4. In a secrecy system of radio communication, a source of high frequency carrier waves, means for transmitting on said carrier waves a succession of pulses modulated in frequency in accordance with a desired signal, means for transmitting on said carrier waves a continuously frequency modulated undesired signal, and receiving means continuously tuned to said carrier waves and responsive only to frequency modulation of pulses transmitted thereon, thereby selectably to detect said desired signal.

STANFORD GOLDMAN.

REFERENCES CITED

The following references are of record in the file of this patent:

UNITED STATES PATENTS

| Number | Name | Date |
|---|---|---|
| 1,672,215 | Heising | June 5, 1928 |
| 1,634,390 | Zworykin | July 5, 1929 |
| 1,848,839 | Ranger | Mar. 8, 1932 |
| 2,045,107 | Shore | June 23, 1936 |
| 2,089,639 | Bedford | Aug. 10, 1937 |
| 2,227,108 | Roosenstein | Dec. 31, 1940 |
| 2,227,596 | Luck | Jan. 7, 1941 |
| 2,252,293 | Ohl | Aug. 12, 1941 |
| 2,256,336 | Beatty | Sept. 16, 1941 |
| 2,266,194 | Guanella | Dec. 16, 1941 |

FOREIGN PATENTS

| Number | Country | Date |
|---|---|---|
| 541,665 | Great Britain | Dec. 5, 1941 |

OTHER REFERENCES

Wireless Engineer, W. C. Gee, October 1940, pages 441, 442.